Sept. 7, 1948.   A. T. SCHEIWER   2,448,688
COUPLING
Filed May 21, 1945
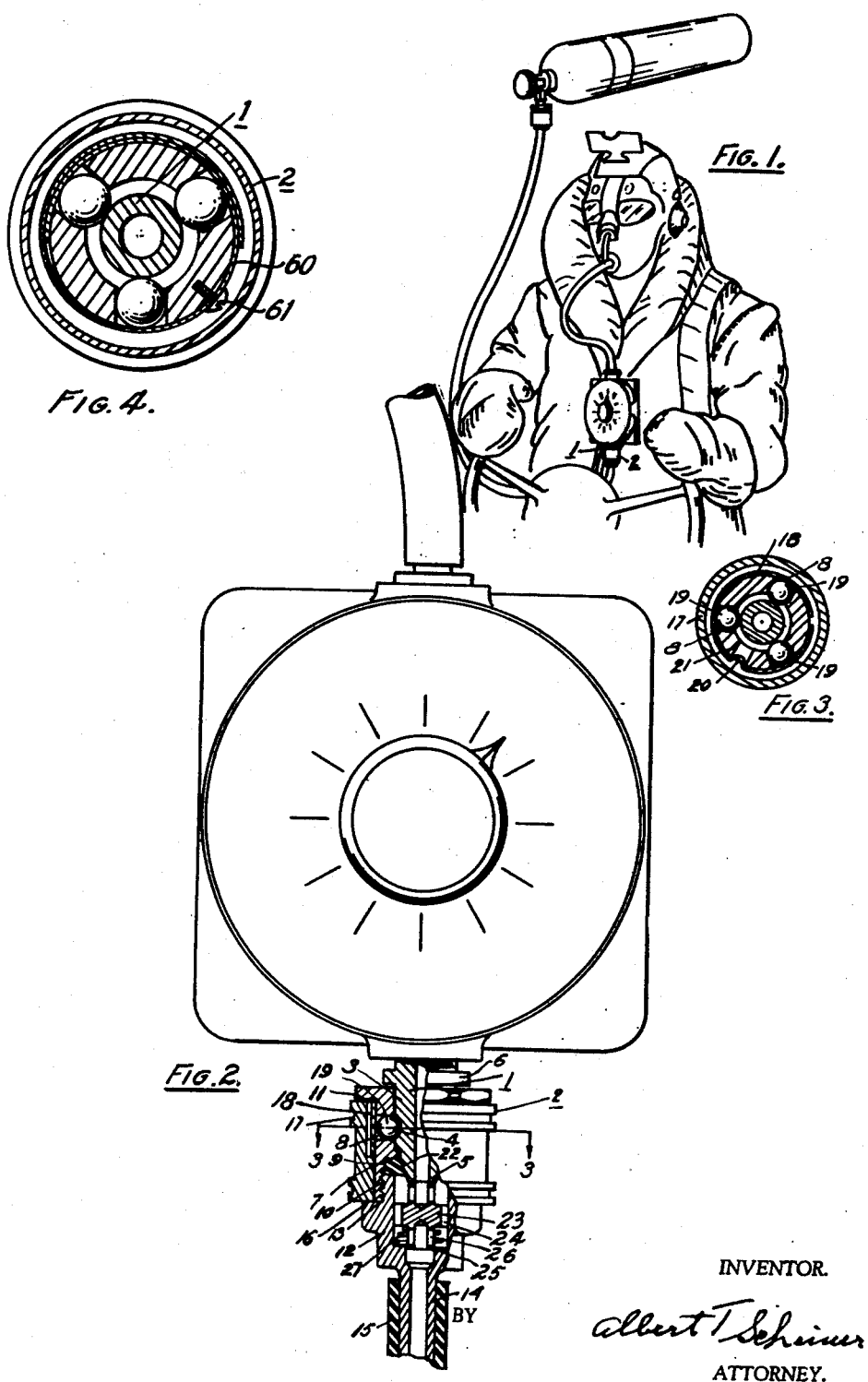
INVENTOR.
Albert T Scheiwer
ATTORNEY.

Patented Sept. 7, 1948

2,448,688

UNITED STATES PATENT OFFICE 2,448,688

COUPLING

Albert T. Scheiwer, Erie, Pa.

Application May 21, 1945, Serial No. 594,929

2 Claims. (Cl. 285—97.3)

This invention relates generally to couplings and more particularly to quickly attachable and detachable snap-type couplings.

Previous couplings have required manual manipulation of locking sleeves and the like in order to connect the male and female members thereof. These prior couplings have been found inadequate for use in airplanes where a quick connection to an oxygen mask must be made with heavy mittens which must be perfectly sealed and which must swivel for efficient operation.

It is, accordingly, an object of my invention to overcome the above and other defects in present type couplings and it is more particularly an object of my invention to provide a snap-type coupling which is simple in construction, economical in cost, economical in manufacture, and efficient in operation.

Another object of my invention is to provide a quickly attachable and detachable coupling which can be connected by merely inserting the male member into the female member and which can be disconnected by merely pulling the male member out of the female member.

Other objects of my invention will become evident from the following detailed description, taken in conjunction with the accompanying drawings, in which Fig. 1 is a diagrammatic view showing my novel coupling connected to an oxygen mask.

Fig. 2 is a side elevational view of my novel coupling with parts broken away.

Fig. 3 is a view taken on the line 3—3 of Fig. 2, and

Fig. 4 is a transverse sectional view of my novel coupling with another form of spring member.

Referring now to the drawings, Figs. 1, 2, and 3 show a male member 1 and a female member 2. The male member 1 has a connecting portion 3 with a peripheral groove 4, a reduced end portion 5, and a shoulder 6. The female member 2 comprises an inner shell or sleeve 7 having radially extending ball-retaining apertures 8, an inner groove 9, an internally threaded portion 10; and a shoulder 11; an attaching member 12 having a threaded portion 13 for engaging the threaded portion 10 of the sleeve 7, a hose connecting portion 14 for receiving a hose 15 and a shoulder 16; and an internally grooved outer sleeve 17. A flat spring member 17 is disposed over the apertures 8 to lock ball members 19 into locking engagement with the groove 4 on the connecting portion 3 of male member 1. The spring member 17 is crimped at 20 which engages a slot 21 in the sleeve 7 to prevent the rotation of the spring 19. A washer 22 with an internal tapered portion sealingly engages the end portion 5 on the male member 1 when connected as in Fig. 1.

A check valve 23 with radially extending fins 24 and outwardly projecting tubular portions 25 with apertures 26 is disposed in the female member 2. A spring 27 urges the check valve 23 against the washer 22 to seal the female member 2 when disconnected.

In operation, the connecting portion 3 of the male member 1 is inserted into the female member 2 as shown in Fig. 2 wherein the ball members 19 are forced outwardly against the spring 18 and then the ball members 19 drop into the groove 4 in the connecting portion 3 of the male member 1 and the spring 18 forces the ball members 19 into the groove 4 to connect the male and female members 1 and 2 together. The male member 1 is merely pulled from the female member 2 to disconnect them.

Fig. 4 shows a flat screw member 60 held against rotation by the screw member 61 disposed in the groove 46 in the sleeve 43 shown in Figs. 4 and 5 instead of the coil spring 50. The operation is the same.

It will be evident from the foregoing that I have provided a very simple coupling member which may be connected and disconnected by merely inserting into or pulling from the female member its mating male member with a check valve automatically sealing the female member when disconnected.

Various changes may be made in the specific embodiment of my invention without departing from the spirit thereof, or from the scope of the appended claims.

What I claim is:

1. A coupling comprising a male member having a connecting portion with a peripheral groove; and a female member comprising a sleeve having radially extending ball-retaining apertures therearound, ball members carried in said apertures, a member externally of said sleeve forming with said sleeve an annular groove and a flat annular-shaped spring for disposal in said groove and in engagement with the outer periphery of said inner sleeve adapted to engage said ball members and force them inwardly.

2. A coupling as set forth in claim 1 wherein means are provided for holding said spring member against rotation in said annular groove.

ALBERT T. SCHEIWER.

REFERENCES CITED

The following references are of record in the file of this patent:

UNITED STATES PATENTS

| Number | Name | Date |
|---|---|---|
| 1,754,639 | Meyer | Apr. 15, 1930 |
| 2,069,377 | Matthiessen | Feb. 2, 1937 |
| 2,086,569 | Meyer | July 13, 1937 |
| 2,318,965 | Parker et al. | May 11, 1943 |